United States Patent [19]

Tsuchiya et al.

[11] Patent Number: 5,156,861

[45] Date of Patent: Oct. 20, 1992

[54] WASHING APPARATUS OF A SCREW FOR EXTRUDERS

[75] Inventors: Shiro Tsuchiya; Kinichi Kaneko; Hiroshi Kasahara; Hirokazu Ohnishi; Mitsuaki Hashimoto, all of Osaka, Japan

[73] Assignees: Hitachi Zosen Trading & Manufacturing Co., Ltd.; San-Ai Engineering Ltd., both of Osaka, Japan

[21] Appl. No.: 704,335

[22] Filed: May 23, 1991

[30] Foreign Application Priority Data

May 24, 1990 [JP] Japan ................. 2-134497
May 24, 1990 [JP] Japan ................. 2-134498

[51] Int. Cl.⁵ .................................. B08B 3/00
[52] U.S. Cl. .......................... 425/225; 134/144; 134/157; 134/172; 425/230
[58] Field of Search ............ 134/144, 149, 157, 172; 425/225, 230

[56] References Cited

U.S. PATENT DOCUMENTS

| | | | |
|---|---|---|---|
| 3,225,777 | 12/1965 | Shelton et al. | 134/144 |
| 3,703,905 | 11/1972 | Ice, Jr. | 134/144 |
| 4,509,544 | 4/1985 | Mains, Jr. | 134/144 |
| 5,052,423 | 10/1991 | Chapman et al. | 134/181 |
| 5,074,323 | 12/1991 | Chapman et al. | 134/181 |

FOREIGN PATENT DOCUMENTS 3114307 10/1982 Fed. Rep. of Germany ...... 134/172

Primary Examiner—Jay H. Woo
Assistant Examiner—Scott Bushey
Attorney, Agent, or Firm—Koda and Androlia

[57] ABSTRACT

A washing apparatus of a screw for extruder including a casing, support rollers installed in the casing so as to support a screw rotatably, a drive motor for rotating the screw, a water jet assembly having a nozzle and nozzle rotation section, a nozzle inclination motor to incline the water jet assembly relative to the axis direction of the screw. A nozzle hole of the water jet assembly is inclined to face one way relative to the axis of the screw placed on support roller assemblies. The nozzle is rotated eccentrically about the nozzle hole and moved from one end to the other of the screw, changing the nozzle hole direction to the other way relative to the screw at the other end of the screw. The screw is rotated so that an unwashed part of the screw faces the nozzle and is washed. This cycle is repeated until the entire surface of the screw is rotated.

3 Claims, 3 Drawing Sheets

WASHING APPARATUS OF A SCREW FOR EXTRUDERS

BACKGROUND OF THE INVENTION

1. Field of the Invention

The present invention relates to a washing method and apparatus of a screw for extruder and the like.

2. Prior Art

One example of a screw washing machine is described in the Japanese Utility Model Publication No. S63-16495. In this washing machine, a plurality of support roller assemblies, each comprising a pair of rollers, are disposed in a casing so as to support thereon a screw rotatably and horizontally. The support roller assemblies are rotated by power, and the screw is rotated by friction force. A rail is provided parallel to the axial direction of the screw, and on the rail is a traveling stand which is moved by a reciprocation means. A water jet assembly, having a nozzle tip that faces the screw, is mounted on the traveling stand. Two nozzle holes are provided on the nozzle tip, one is perpendicular and the other is inclined 15-45 degrees against the axial direction of the screw.

The above-described washing machine has some problems. Many unwashed areas remain on the screw after one washing process since the nozzle hole of the washing machine is positionally fixed and the water cannot reach every part of the screw according to the angle of the screw thread surface against the screw axial direction.

Therefore, a repetitious washing process must be taken so as to clean the entire screw surface. In addition, since the washing machine has two holes in the nozzle, a great amount of water is needed. The pump capacity becomes larger as well as the a motor used for driving the pump. As a result, the electric power consumption becomes very large.

SUMMARY OF THE INVENTION

Accordingly, it is an object of the present invention to overcome the above described problems and to provide a washing method and an apparatus in which nozzle tip has one nozzle hole and a pump capacity is small. Also, the direction of the nozzle tip can be freely changed according to the angle of the screw thread surface against the screw axial direction.

The above described objects of the present invention are accomplished by a unique method and a structure for a washing apparatus for screws used in extruding machines (or extruders) wherein a nozzle hole of a water jet assembly is set inclined to face one way relative to the axis direction of a screw placed horizontally on support roller assemblies. The nozzle is rotated eccentrically about the nozzle hole and moved from one end of the screw to the other. The nozzle hole changes the direction to face the other way relative to the axial direction of the screw at the other end of the screws, and rotating the screw at a predetermined angle so that the unwashed part of the screw faces up towards the nozzle. The above described cycle is repeated until the screw is rotated at least about 360 degrees.

DETAILED DESCRIPTION OF THE INVENTION

Referring to the Figures, shown therein is the basic arrangement of the washing apparatus of this invention.

Figure 1:
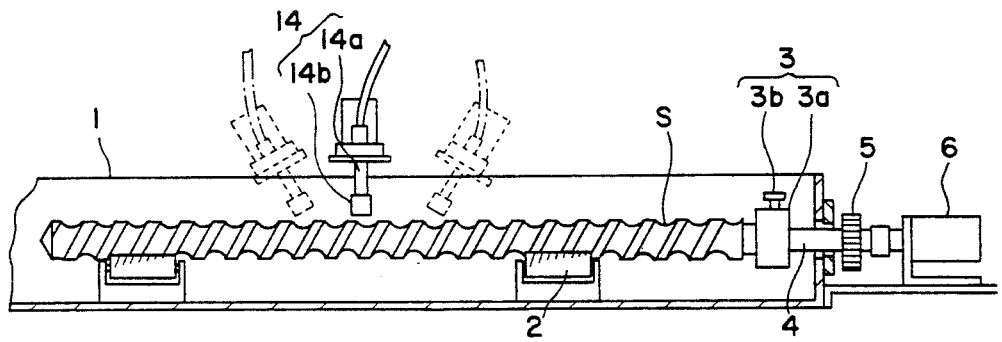
FIG. 1 shows a vertical sectional view of one embodiment of the screw washing apparatus according to the present invention.
Figure 2:
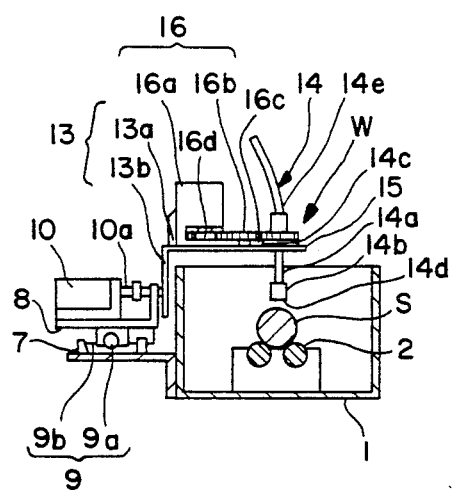
FIG. 2 shows a partially sectioned left side view of FIG. 2.

As shown in FIG. 1 and FIG. 2, a casing 1 of the washing apparatus includes two support roller assemblies 2, each comprising a pair of rollers and being disposed on the bottom of the casing 1 so as to support thereon a screw S rotatably and horizontally. The height of the support roller assemblies 2 is adjustable so as to support the lower part of the screw S without regard to the diameter thereof.

One end of the screw S is connected to a drive shaft 4 by a connector 3. The connector 3 includes a cap 3a and a bolt 3b. A drive motor 6 rotates intermittently by a constant angle, and the movement of the drive motor 6 is transmitted to the drive shaft 4 by a reduction gear 5. The inner diameter of the cap 3a is larger than the boss part of the screw S, and bolt 3b penetrates the cap to set in the key way of the boss part. Thus, the screw S is rotated smoothly without any trouble even if the screw S and the cap 3a are slightly eccentric from each other.

Outside of the casing 1, a rail 7 is provided parallel to the axial direction of the screw S. On the rail 7 is movably mounted a traveling stand 8 via a stand carrying means 9. The stand carrying means 9 consists of a nut member 9b (which is connected to the undersurface of the traveling stand 8), and a screw rod 9a thread-engaged with the nut member 9b. A travel motor (not shown) is used to drive the screw rod 9b.

On the traveling stand 8 is mounted a water jet assembly W comprised of a nozzle inclination motor 10, a nozzle stand 13, a nozzle 14, and a nozzle rotation section 16. A nozzle stand support shaft 10a extends horizontally towards the screw S and is rotated via the nozzle inclination motor 10 in the clockwise and counter-clockwise directions within a range of about 90 degrees.

At the end of the nozzle stand support shaft 10a is attached the nozzle stand 13 that includes a nozzle mount 13a and leg 13b. The nozzle mount 13a extends horizontally from the upper end of the leg 13b to above the screw S. On the nozzle stand 13 is provided the nozzle rotation section 16 comprised of a nozzle rotation motor 16a and a first transmission gear 16d. A turning force of the nozzle rotation motor 16a is transmitted to the nozzle 14 via the first, second, and third transmission gears 16d, 16b and 16c, respectively.

The nozzle 14 is comprised of a lead pipe 14a, nozzle tip 14b, a flange 14c, and a nozzle tube 14e.

The nozzle 14 is rotatably mounted on the nozzle stand 13. The lead pipe body 14a hangs down vertically, while the lower end tip 14b is confronting the screw S. The nozzle hole 14d provided on the nozzle tip 14b is eccentric against the lead pipe 14a. The lead pipe 14a is supported so as to rotate about the vertical axis by the flange 14c and a nozzle bearing 15 of thrust bearing.

The nozzle rotation section 16 is mounted on the nozzle stand 13 and rotates the lead pipe 14a of the nozzle 14 about the vertical axis.

In operation, the screw S is first placed horizontally on the support roller assemblies 2 as shown in FIGS. 1 and 2 and connected to the drive shaft 4 by the connector 3. The nozzle inclination motor 10 is rotated in the clockwise direction in the range of about 45 degrees. As a result, the water jet assembly W is inclined relative to the axis direction of the screw S as indicated by the two-dotted line in FIG. 1.

When the nozzle rotation motor 16a starts, the lead pipe 14a rotates and as a result, the nozzle tip 14b having the nozzle hole 14d swivels about the lead pipe 14a, drawing a circle. In this state, when water is supplied to the nozzle 14, the water is widely blown over the surface of the screw S, thus washing the screw S.

Next, when the travel motor (not shown) starts, the screw rod 9b is rotated, and the traveling stand 8 is moved on the nut member 9a in the axis direction of the screw S. The water jet assembly W provided on the traveling stand 8 is moved, for instance, from the left to the right of the screw S in the drawing, and reaches at the right end position of the screw S. As a result, a right-side limit switch (not shown) is actuated, and the travel motor stops.

Next, by the signal from the right-side limit switch, the nozzle inclination motor 10 is started to rotate in the opposite direction about 90 degrees and sets its inclined position as shown by the one-dotted line in FIG. 1, so that the nozzle 14 changes its direction relative to the axial direction of the screw S. Then, the travel motor (not shown) rotates in the opposite direction and the traveling stand 8 travels from the right to the left of the screw S, and water is supplied to the nozzle 14 and washes the screws.

When the traveling stand 8 reaches at the left end position of the screw S, a left-side limit switch (not shown) is actuated and the travel motor stops. By the signal of the left side limit switch, the motor 6 is started, and the screw S is rotated at a predetermined angle (for example 60 degrees) via the reduction gear 5 so that the unwashed part of the screw S faces up or faces the nozzle tip 14b. The support roller assemblies 2 are rotated by the screw S by friction.

The above described cycle is repeated until the screw S is rotated 360 degrees and washed and cleaned for its entire surface. All the operation is automatically controlled by a sequence circuit (not shown).

As described above, the nozzle hole 14d of the nozzle tip 14b can face the entire threaded surface under the best condition, and the water jet from the nozzle hole 14d washes and cleans the threaded surface of the screw S with an angle of the best efficiency. Thus, the substance on the threaded surface of the screw S is removed effectively.

After the washing, the drive motor 6, travel motor (not shown), nozzle rotation motor 16a and inclination motor 10 are all stopped. The bolt 3b of the connector 3 is loosened, and the screw S is removed from the cap 3a. The washing operation is thus completed.

Figure 3:
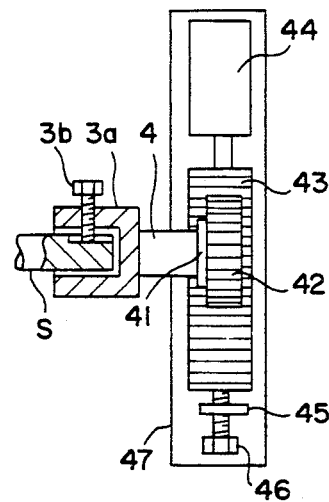
FIG. 3 shows an enlarged sectional view of another embodiment of a screw drive device.

FIG. 3 shows another embodiment of the screw drive device. In this embodiment, a pinion 42 is fitted to the drive shaft 4 via a one-way clutch 41. A rack 43 engages with the pinion 42 and is moved in reciprocation by an air piston cylinder mechanism 44. For adjusting the stroke of the rack 43, a stroke adjusting bolt 46 is provided on a post 45 so that upper end of the bolt 46 comes into contact with the rack 43. All these elements described above are mounted on a stand 47.

When the rack 43 advances (or when a piston rod of the air piston mechanism 44 moves out of the cylinder), the pinion 42 and the drive shaft 4 rotate together via the one-way clutch 41. When the rack 43 retreats, the pinion 42 reversely rotates by the movement of the rack 43 but the drive shaft 4 does not rotate because the one-way clutch 41 races. The stroke of the piston of the air piston cylinder mechanism 44 is adjusted by the stroke of the rack 43, and this can be performed by the compressibility of the air in the air piston cylinder mechanism 44. By the above screw drive device, even the long and heavy screw 8 (for example, 10 m long and 300 mm across) can securely be intermittently rotated by the simple construction as described above.

Figure 4:
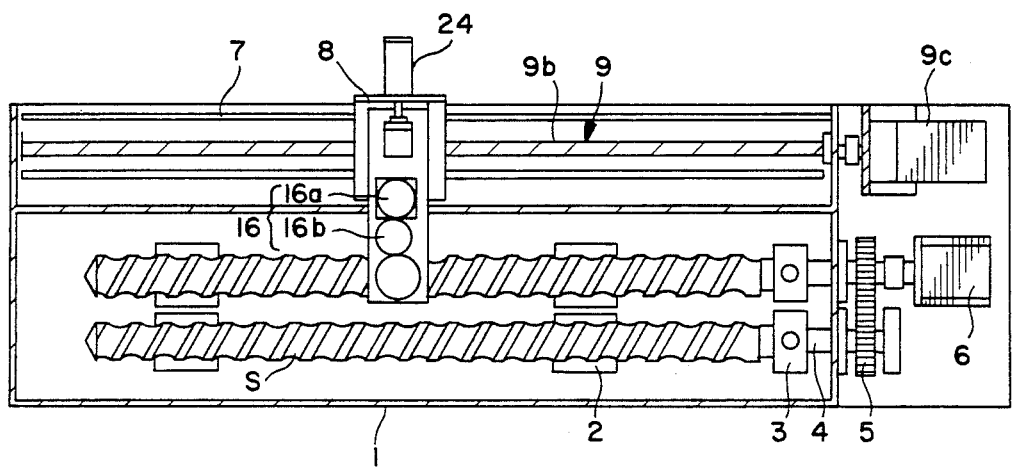
FIG. 4 shows a top plan view of another embodiment of the washing apparatus of the present invention.
Figure 5:
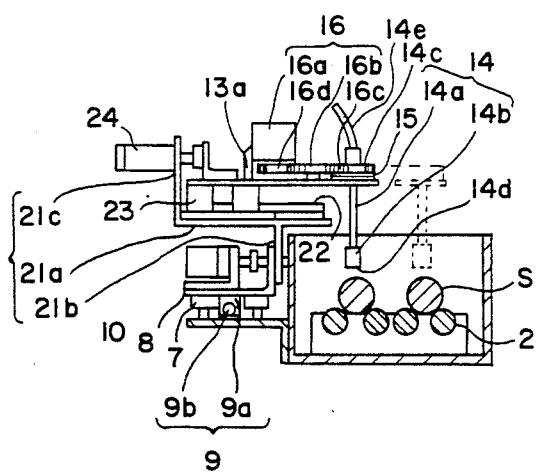
FIG. 5 shows a partially sectioned left side view of FIG. 4.

FIGS. 4 and 5 show another embodiment of the washing apparatus. Elements which are the same as those of FIGS. 1 and 2 (or which correspond thereto) are labeled with the same symbols, and a description of the same elements will be omitted.

In this embodiment, two screws are disposed in parallel on two sets of support roller assemblies 2 which are made up with a pair of rollers, respectively. The difference between this embodiment and the previous embodiment is that this embodiment has an intermediate stand 21 secured on the output shaft 10a of the nozzle inclination motor 10 and has a nozzle stand reciprocating means 24 for driving the nozzle stand 13.

The intermediate stand 21 includes a main body 21a, leg 21b, and a perpendicular member 21c. On the main body 21a is provided a second guide rail 22 at right angles against the screw S, and on the second guide rail 22 is provided the nozzle stand 13 via a bearing 23. A nozzle reciprocating means 24, which is a fluid piston cylinder mechanism, is provided on the perpendicular member 21c and drives the nozzle stand 13 along with the second guide rail 22.

In operation, when the washing of one of the two screws is completed, the nozzle reciprocating means 24 drives the nozzle stand 13 to be moved on the second guide rail 22 so that the nozzle 14 is shifted and moved over the second screw S. When the nozzle reciprocating means 24 stops its drive, a limit switch (not shown) is actuated and the same washing process as described above is performed.

Figure 6:
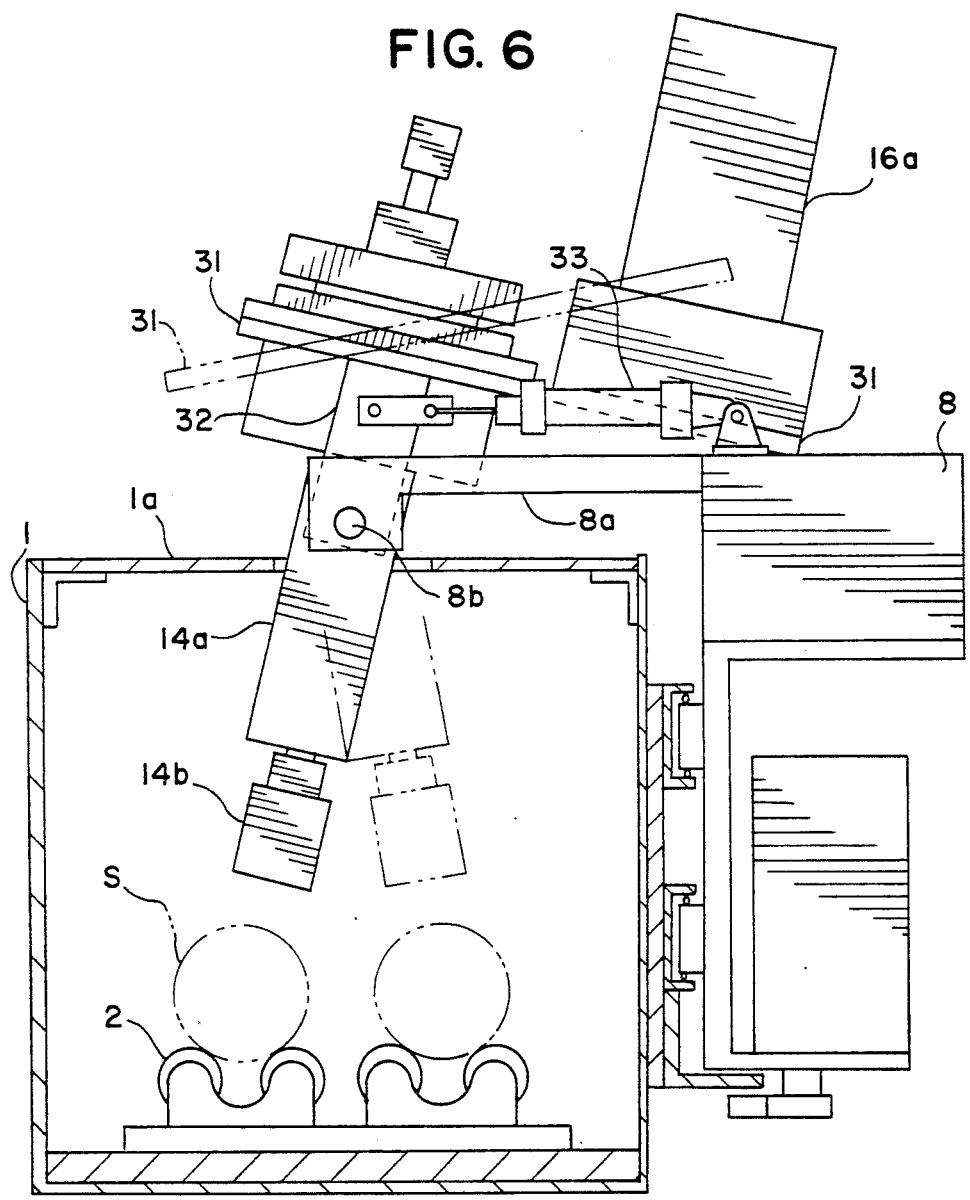
FIG. 6 shows an enlarged partially sectional side view of another embodiment of the washing apparatus.

FIG. 6 shows another embodiment of the present invention. Elements which are the same as (or correspond to) those of FIGS. 1 through 5 are labeled with the same symbols, and a description of those elements is omitted. This embodiment is different from the aforementioned two embodiments in the structure of the nozzle stand.

In this embodiment, two arms 8a are provided in parallel (only one arm is seen in the Figure) and extend horizontally over the screw S from the traveling stand 8. Two feet 32 of a nozzle stand 31 (only one foot is seen in the Figure) are pivotally mounted on the end of the arm 8a by a pin 8b. The pin 8b is straightly above the space between the two screws and positioned slightly above the cover 1a of the casing 1. On the traveling stand 8 is provided a swing means 33 which is a fluid piston cylinder mechanism. One end of the swing means 33 is connected to the traveling stand 8, and the other end is connected to the side of the foot 32. Thus, the nozzle stand 31 is pivotally supported on the traveling stand 8.

When the swing means 33 is actuated with the nozzle chip 14b set as shown by the solid line in FIG. 6, the angle of the nozzle stand 31 against the traveling stand 8 is changed so that the nozzle tip face the other screw. In other words, the nozzle tip 14b is changed to face one screw to the other by means of the swing means 33.

The area of the cover 1a near the swing center of the nozzle stand 31 is open, and all the other elements are covered by the cover 1a; thus, the water jet scattering can be minimized.

Depending upon the inclination angle of the threaded surface of the screw S, it may not be necessary to change the direction of the nozzle. In this case, the screw is intermittently rotated every time the nozzle moves one end to the other of the screws.

This invention can be applied to wash and clean the screws used for injection molding, mixing and other uses other than the extruding.

Many apparently and widely different embodiments of this invention can be made without departing from the spirit or scope of the invention, and it should be understood that the invention is not limited to the specific embodiments as described above and as defined in the appended claims.

According to the present invention, the nozzle hole of the nozzle tip is one, thus, the amount of water used is less, and the pump capacity can be small.

Also, since the direction of the nozzle can be changed according to the inclination angle of the threaded surface of the screw, the washing operation can be done at a maximum washing efficiency. Moreover, since the screw is intermittently rotated, the running cost is low.

Furthermore, according to the present invention, a plurality of screws are automatically cleaned by setting only once, and the apparatus is simple in structure and is also obtainable inexpensively.

In addition, according to the present invention, a scattering of the water can be minimum, by covering the casing top face except near the swing center of the nozzle stand.

We claim:

1. A washing apparatus of a screw for an extruder comprising:
    a plurality of support roller assemblies each comprising a pair of rollers and being disposed on a bottom of a casing so as to support thereon a screw rotatably and horizontally,
    a power rotation means for rotating said screw,
    a rail provided parallel to an axial direction of said screw,
    a traveling stand movably mounted on said rail via a stand carrying means,
    a water jet assembly mounted on said traveling stand with a nozzle facing said screw,
    said apparatus further comprising:
        a nozzle stand support shaft, which is provided on said traveling stand and extends horizontally towards said screw, said nozzle stand support shaft being rotatable via a nozzle inclination motor in clockwise and counter-clockwise directions;
        a nozzle stand which is attached at an end of said nozzle stand support shaft and extends horizontally to above said screw;
        a nozzle rotatably provided on said nozzle stand and comprising a lead pipe, a nozzle tip and a nozzle tube, said lead pipe being positioned vertically so that said, nozzle tip faces said screw, and said nozzle hole being rotatable eccentrically about said nozzle tube; and
        a nozzle rotation section provided on said nozzle stand so as to rotate said nozzle tube.

2. A washing apparatus of a screw for an extruder comprising:
    a plurality of support roller assemblies each comprising a pair of rollers and being disposed on a bottom of a casing so as to support thereon a screw rotatably and horizontally,
    a power rotation means for rotating said screw,
    a rail provided parallel to axial direction of said screw,
    a traveling stand movably mounted on said rail via a stand carrying means, and
    a water jet assembly mounted on said traveling stand with a nozzle facing said screw, wherein:
    said plurality of support roller assemblies support thereon a plurality of screws;
    a second guide rail is provided obliquely at right angles to said screws;
    a nozzle stand is slidably mounted on said second guide rail;
    a nozzle stand reciprocating means is provided for reciprocating said nozzle stand along said second guide rail so that tip of said nozzle face all of said plurality of screws;
    a nozzle is rotatably provided on said nozzle stand, said nozzle comprising a lead pipe, a nozzle tip and a nozzle tube, said lead pipe being positioned vertically so that said nozzle tip faces said screws, and said nozzle hole being rotatable eccentrically about said nozzle tube; and
    a nozzle rotation section is provided on said nozzle stand so as to rotate said nozzle tube.

3. A washing apparatus of a screw for an extruder comprising:
    a plurality of support roller assemblies each comprising a pair of rollers and being disposed on a bottom of a casing so as to support thereon plurality of screws rotatably and horizontally,
    a power rotation means for rotating said screw,
    a rail provided parallel to an axial direction of said screw,
    a traveling stand movably mounted on said rail via a stand carrying means,
    a water jet assembly mounted on said traveling stand with a nozzle facing said screw, wherein:
    a nozzle stand is fitted to said traveling stand so as to pivot along a horizontal axis which is parallel to axes of said screws, said nozzle stand extending over said screws;
    a swing means is connected between said traveling stand and said nozzle stand to change the angle between said nozzle stand and said traveling stand so as to face the nozzle tip towards all of said screws;
    a nozzle is rotatably provided on said nozzle stand, said nozzle comprising a lead pipe, a nozzle tip and a nozzle tube, said lead pipe being positioned vertically so to said nozzle tip faces said screw, and said nozzle hole being rotatable eccentrically about said nozzle tube;
    and a nozzle rotation section is provided on said nozzle stand so as to rotate said nozzle tube.

* * * * *

UNITED STATES PATENT AND TRADEMARK OFFICE
CERTIFICATE OF CORRECTION

PATENT NO. : 5,156,861
DATED      : October 20, 1992
INVENTOR(S): SHIRO TSUCHIYA, et al.

It is certified that error appears in the above-identified patent and that said Letters Patent is hereby corrected as shown below:

On the title page,
Column [75] Inventors:   Change "Kinichi Kaneko" to --Kenichi Kaneko--

Signed and Sealed this

Twelfth Day of October, 1993

Attest:

BRUCE LEHMAN

*Attesting Officer*              *Commissioner of Patents and Trademarks*